United States Patent [19]

Heck et al.

[11] Patent Number: 5,374,350
[45] Date of Patent: Dec. 20, 1994

[54] PROCESS FOR TREATING HEAVY OIL

[75] Inventors: Roland H. Heck, Pennington; Lillian A. Rankel, Princeton, both of N.J.

[73] Assignee: Mobil Oil Corporation, Fairfax, Va.

[21] Appl. No.: 4,216

[22] Filed: Jan. 13, 1993

Related U.S. Application Data

[63] Continuation of Ser. No. 747,829, Aug. 21, 1991, abandoned.

[51] Int. Cl.⁵ .................. C10G 45/04; B01J 21/18
[52] U.S. Cl. .................. 208/143; 208/216 R; 208/217; 208/251 H; 502/185
[58] Field of Search .................. 208/143, 216 R, 217, 208/251 H; 502/185

[56] References Cited

U.S. PATENT DOCUMENTS

| | | | |
|---|---|---|---|
| 2,771,401 | 11/1956 | Shepherd | 196/28 |
| 3,617,481 | 11/1971 | Voorhies, Jr. et al. | 208/50 |
| 3,715,303 | 5/1971 | Wennerberg | 208/112 |
| 3,803,054 | 4/1974 | Habig et al. | 252/439 |
| 3,812,029 | 5/1974 | Wennerberg et al. | 208/121 |
| 3,876,523 | 4/1975 | Rosinski et al. | 208/89 |
| 3,997,473 | 12/1976 | Schmitt, Jr. et al. | 502/185 |
| 4,046,670 | 9/1977 | Seguchi et al. | 208/48 AA |
| 4,176,051 | 11/1979 | Ternan et al. | 208/112 |
| 4,214,977 | 7/1980 | Ranganathan et al. | 208/108 |
| 4,299,685 | 11/1981 | Khulbe et al. | 208/48 AA |
| 4,317,712 | 3/1982 | Farcasiu | 208/46 |
| 4,389,301 | 6/1983 | Dahlberg et al. | 208/59 |
| 4,399,024 | 8/1983 | Fukui et al. | 208/131 |
| 4,406,772 | 9/1983 | Sasaki et al. | 208/112 |
| 4,419,225 | 12/1983 | Kukes et al. | 208/251 R |
| 4,421,638 | 12/1983 | Nowack et al. | 208/251 R |
| 4,447,314 | 5/1984 | Banta | 208/251 H |
| 4,482,641 | 11/1984 | Wennerberg | 502/182 |
| 4,518,488 | 5/1985 | Wennerberg | 208/216 R |
| 4,557,822 | 12/1985 | Bearden, Jr. et al. | 208/112 |
| 4,582,592 | 4/1986 | Masada et al. | 208/108 |
| 4,624,773 | 11/1986 | Hettinger, Jr. et al. | 208/120 |
| 4,656,153 | 4/1987 | Wennerberg | 502/182 |
| 4,826,797 | 5/1989 | Chianelli et al. | 502/221 |
| 4,828,680 | 5/1989 | Green et al. | 208/120 |
| 4,863,887 | 9/1989 | Ohtake et al. | 502/150 |
| 5,051,389 | 9/1991 | Lang et al. | 502/185 |

OTHER PUBLICATIONS

"Adsorption, Surface Area, and Porosity," S. J. Gregg, and K. S. W. Sing, 2nd ed., 1982, p. 169 (Academic Press, Inc.).

Toulhoat et al., "Upgrading Heavy Ends Into Marketable Distillates: New Concepts And New Catalysts For Two Key Stages, HDM and HDN", Catalysts in Petroleum Refining 1989, pp. 463–471 (no month available).

*Primary Examiner*—Paul Lieberman
*Assistant Examiner*—Patricia Hailey
*Attorney, Agent, or Firm*—Alexander J. McKillop; Malcolm D. Keen; Laurence P. Hobbes

[57] ABSTRACT

Heavy oil is hydrotreated by processing with hydrogen in the presence of a catalyst composition comprising an activated carbon component having a specified range of pore volume distribution and average pore diameter, a molybdenum or tungsten component and a cobalt or nickel component to reduce the content of nickel and vanadium therein and to achieve demetallation and conversion of the carbon residue for producing a lighter oil.

17 Claims, 3 Drawing Sheets

PROCESS FOR TREATING HEAVY OIL

This is a continuation of copending application Ser. No. 07/747,829, filed on Aug. 21, 1991, now abandoned.

BACKGROUND OF THE INVENTION

1. Field of the Invention

This invention relates to a process for converting and upgrading heavy oils to produce a product suitable for transport through a pipeline and for further processing.

2. Background of the Art

As high quality crude oils are depleted, an inexpensive substitute for use as petroleum refinery feedstock becomes more desirable. One such substitute is petroleum residue, or heavy oil, such as that produced from the straight run distillation of crude oil. Another substitute for high quality crude oils are heavier crude oils.

The world's supply of light, sweet crudes has greatly diminished in recent years. Refiners have been forced to deal with ever heavier crudes, containing significantly more metals, while still producing a full spectrum of products. Much of the problem of upgrading these heavier stocks is due to the presence of so much metal, usually nickel and vanadium. The presence of large amounts of metal, usually in association with asphaltenes, presents a formidable upgrading challenge. Some of the worst of these materials are "heavy crudes" while almost as bad are somewhat lighter crudes which contain less asphalt, but even more metal. Each type of resource will be briefly reviewed.

Heavy Crudes

Extensive reserves of petroleum in the form of so-called "heavy crudes" exist in a number of countries, including Western Canada, Venezuela, Russia, the United States and elsewhere. Many of these reserves are located in relatively inaccessible geographic regions. The United Nations Institute For Training And Research (UNITAR) has defined heavy crudes as those having an API gravity of less than 20, suggesting a high content of polynuclear compounds and a relatively low hydrogen content. The term "heavy oil" whenever used in this specification means an oil having an API gravity of less than 20 and includes both heavy crude oil and heavy petroleum fractions such as petroleum residue produced from the distillation of crude oil. In addition to a high specific gravity, heavy crudes in general have other properties in common including a high content of metals, nitrogen, sulfur and oxygen, and a high Conradson Carbon Residue (CCR). The heavy crudes generally are not fluid at ambient temperatures and do not meet local specification for pipelineability. It has been speculated that such crudes have resulted from microbial action which consumed alkanes leaving behind the heavier, more complex structures which are now present.

A typical heavy crude oil is that recovered from tar sands deposits in the Cold Lake region of Alberta in northwestern Canada. The composition and boiling range properties of a Cold Lake crude (as given by V. N. Venketesan and W. R. Shu, *J. Canad. Petr. Tech.*, page 66, July-August 1986) is shown below.

High Metal Content Crudes

Although considerably lighter than the "heavy crudes", the high metal content crudes such as Mayan crude present similar processing difficulties. The high metals crudes are those which are difficult to process by conventional catalytic methods such that at least the highest boiling portions of these crudes are thermally upgraded by coking or visbreaking. Generally the heaviest fractions, which contain most of the metal, are separated from the lighter fractions by fractionation or vacuum fractionation to recover a gas oil or vacuum gas oil and lighter fractions which with difficulty can be upgraded catalytically.

Unfortunately, the lighter fractions obtained from high metals crudes still contain relatively large amounts of metals. Although the gas oil and vacuum gas oil fractions can be upgraded in, e.g., an FCC, the metal content of such gas oils is so high that some form of metals passivation, or hydrotreating of the feed to remove metals, is usually necessary.

Heavy oils are not extensively used as a refinery feed in part because their viscosity is too high for transmission through a pipeline and in part because their metals content, especially nickel and vanadium, is too high. Nickel and vanadium are present as stable nitrogen complexes in the form of prophyrins, which cause severe refinery problems, poison catalysts and can be detrimental to the quality of products.

The progressive depletion and rising cost of high quality crudes has created a need for a process for inexpensively converting heavy oils to pipelineable syncrudes, preferably in a way that will not make downstream processing operations more difficult. Such a process would augment the supply of available crude and would make it possible for refiners to blend syncrude with a more conventional feed for catalytic cracking or hydrotreating.

Heavy oils can be pumped through heated pipelines but this requires the expenditure of a considerable amount of energy. Hence, heavy oils are usually treated by processes such as visbreaking, coking and deasphalting. A description of these processes may be found in *Modern Petroleum Technology*, Fourth Edition, edited by Hobson & Pohl, pp. 281 to 288 and 422 to 423.

However, these processes are accompanied by certain drawbacks. Visbreaking, i.e., viscosity breaking, is a relatively mild thermal cracking process which yields reduced viscosity products. However, with most heavy oils conventional visbreaking yields incompatible two phase products. Coking is a more severe thermal cracking process which converts residual oils such as pitch and tar into gas, naphtha, heating oil, gas oil and coke. Coking requires a large refinery operation. Deasphalting produces low yields of pipelineable oil.

Fractionation to concentrate the lighter portions of the whole crude is somewhat effective but the fractionation itself changes the crude causing metals to migrate into the lighter fractions. The gas oil or vacuum gas oil fractions obtained by fractionation are believed to be more contaminated with metal than can be accounted for by assuming that all, or almost all, of the metals are associated with the asphaltic residual portion of the crude.

Hydrotreatment has been used as a method for upgrading heavy oil and catalysts employed therein include CoMo/alumina and activated carbon.

U.S. Pat. No. 3,715,303 discloses the use of activated carbon as a catalyst in the hydrotreatment of residual hydrocarbons. A required component of the catalyst described therein is an alkali or alkaline earth metal compound such as potassium hydroxide to render the catalyst basic.

U.S. Pat. No. 3,812,028 discloses the use of an activated carbon catalyst for the hydrotreatment of a feed containing polynuclear aromatic compounds by passing the feed through a reaction zone maintained at an elevated temperature and at a hydrogen partial pressure in excess of 2200 psig, and including a catalyst composited of activated carbon and a metallic component.

U.S. Pat. No. 4,518,488 discloses a process for hydrotreating feedstocks containing asphaltenes using a catalyst composited from a porous carbon matrix with a uniform dispersion of metal thereon.

SUMMARY OF THE INVENTION

A goal of the process of the present invention is to upgrade heavy oil to facilitate its pipeline transportation and further processing. The upgrading includes reducing the Conradson Carbon Residue value, reducing the amount of high boiling (e.g. 1000° F.+) fraction of the oil, demetallation and, optionally, desulfurization and asphaltene conversion.

The foregoing is accomplished by means of the hydrotreating process of this invention which comprises hydrotreating a heavy oil feedstock in the presence of an activated carbon as hydrotreating catalyst, the carbon having an average pore diameter of from about 15Å to about 100Å and a pore diameter distribution which includes substantially greater pore area and pore volume in the pore diameter range of from about 100Å to about 400Å. The activated carbon catalyst also includes a molybdenum or tungsten component and a cobalt or nickel component. Preferably, the molybdenum or tungsten component is incorporated into the carbon prior to the incorporation of the cobalt or nickel.

The hydrocarbon oil feedstock is, for example, a 650° F.+ boiling atmospheric distillation residuum. The hydrotreating process typically achieves at least about a 23% reduction of the original metal content (i.e. Ni and V content) together with significant reductions in the sulfur content and Conradson Carbon Residue.

DETAILED DESCRIPTION OF THE PREFERRED EMBODIMENTS

Figure 1:
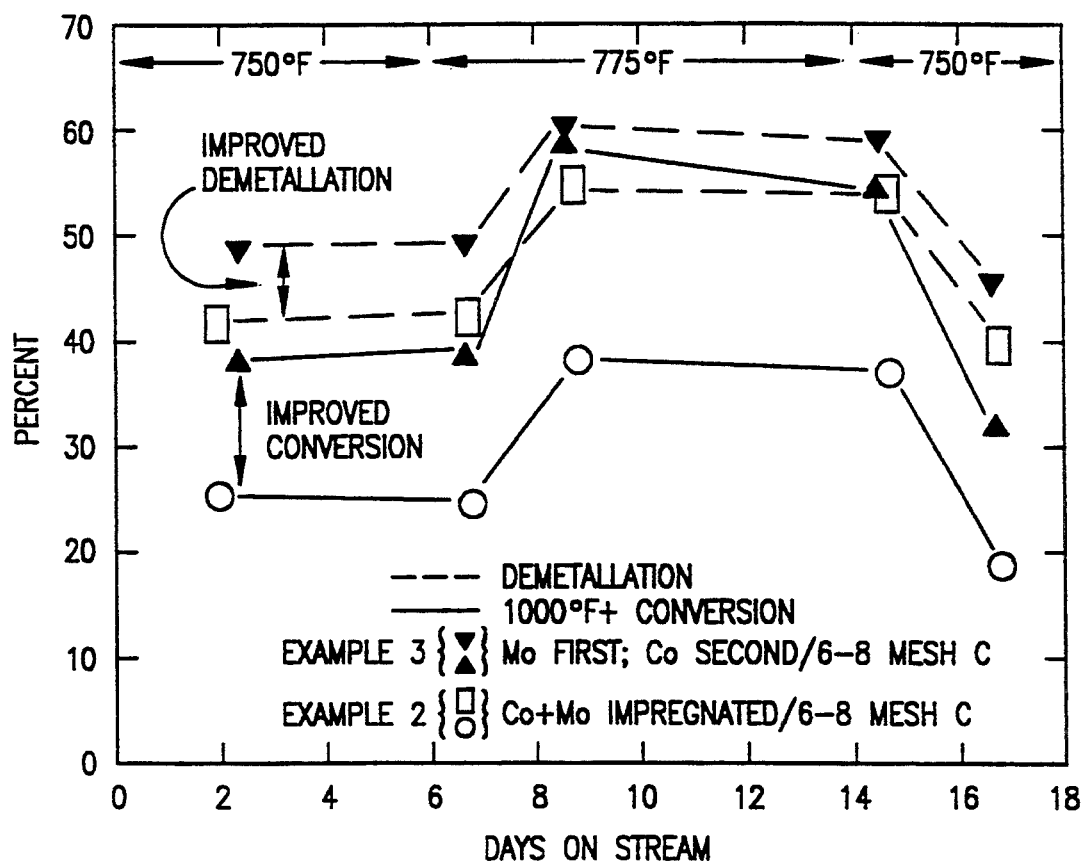
FIG. 1 graphically illustrates the improved percentage of demetallation and conversion by sequential impregnation of molybdenum and cobalt on activated carbon.

In accordance with a preferred embodiment of the present invention, a heavy hydrocarbon oil is upgraded by a hydrotreating process using an activated carbon catalyst. As indicated above, by "heavy oil" or "heavy hydrocarbon oil" is meant a hydrocarbon oil with an API gravity of less than about 20. The hydrocarbon oil undergoes visbreaking, demetallation, and reduction of carbon residue (as measured by Conradson Carbon Residue, "CCR"). Some desulfurization and asphaltene conversion also occurs. The upgraded product can then be used as feed to a fluid catalytic cracker, hydrotreater or hydrocracker.

Feedstock

The heavy hydrocarbon oil feedstock used in the present invention can be, for example, heavy crude oil, vacuum or atmospheric distillation residuum or various other fossil fuels such as tars and oil or shale oil. Light oils can also be treated with the catalyst composition of the present invention to reduce the content of unwanted metals such as nickel and vanadium.

The soluble components include all of the light components of the crude and the heavier components which are readily soluble in aliphatic solvents. Asphaltenes are generally insoluble in aliphatic solvents. The asphaltene fraction from a whole heavy crude can contain almost all of the metals depending upon solvent used for deasphalting. The maltene fraction will have a greatly reduced metals content compared to the asphaltene fraction. The maltenes are somewhat soluble in aliphatic solvents, depending on deasphalting conditions.

The heavy oils contemplated for use herein have very little light components boiling below 650° F. and an abundance of 650° F. + material and asphaltenes. In general terms, the whole crudes contemplated for use herein will have a 50 wt. % boiling point at atmospheric pressure in excess of about 650° F. Frequently, the 40% and even the 30 volume % boiling points of such crudes will exceed 1000° F. such that the crudes will be considered non-distillable. Most heavy crudes are asphaltenic in nature but a few are not. Asphaltenic crudes contain a high proportion of naphthenic and aromatic components and a low paraffin content and are characterized by a low API gravity, e.g., of less than about 30 for the whole crude and less than about 20 API gravity for the 650° F. + fraction. Whole crudes have a CCR content usually in excess of about 10 wt % and a pentane insoluble asphaltene content of at least about 10 wt % (using 10:1 pentane:oil). Many of the heavy crudes have a specific gravity above about 0.9. The 650° F. + fraction of some heavy crudes is so heavy that the specific gravity is about 1.0 (an API gravity of less than about 10) and will sink, not float, in water. More than 25% of the crude boils above 1000° F.

The heavy oils generally contain large amounts of metals such as nickel and vanadium, much, and usually most of which, are coordinated by porphyrin or "porphyrin like" structures. These porphyrins or "porphyrin like" structures coordinate Ni and V in complex aromatic structures that are asphaltic in nature. Typically, heavy oils contain more than 5 ppm by weight of Ni and more than 25 ppm by weight of V on a whole crude basis. The porphyrins undergo degradation reactions which disrupt the aromaticity of the porphyrin rings and transform metal-coordinated porphyrin or metalloporphyrins into metal-coordinated polypyrrolic species. More details on such heavy crudes and porphyrin degradation reactions are provided in "Degradation of Metalloporphyrins in Heavy Oils Before and During Processing", L. A. Rankel, *Fossil Fuels Geochemistry, Characterization & Processing*, ACS Symposium Series No. 344, Chapter 16, (ACS) 1987 ed. R. H. Filby and J. F. Branthaver, which is incorporated herein by reference.

Typical feedstocks, a heavy oil (a Cold Lake crude, Lower Grand Rapids) and a topped Mexican heavy crude (Mayan 650° F. + Primary Production) are shown below. The similarities are evident.

| PROPERTIES OF 650° F. FRACTIONS | | |
|---|---|---|
| | Mayan | Cold Lake |
| % C | 84.0 | 83.8 |
| H | 10.4 | 10.3 |
| N | 0.06 | 0.44 |
| O | 0.97 | 0.81 |
| S | 4.7 | 4.65 |
| CCR | 17.3 | 12.3 |
| % C7-Insoluble | 18.5 | 15.0 |
| Ni, ppm | 78 | 74 |
| V, ppm | 372 | 175 |
| Boiling Range: | | |
| 75–400° F. | 0.62 | 1.3 |
| 400–800° F. | 21.7 | — |
| 400–650° F. | — | 15.2 |
| 800–1050° F. | 19.0 | — |
| 650–1000° F. | — | 29.7 |
| 1050° F.+ | 58.71 | — |
| 1000° F.+ | — | 53.8 |

Typical levels of (Ni+V) in the heavy oils contemplated for use herein will exceed 50 wt ppm (total Ni+V), and frequently will exceed 100 or even 150 wt ppm (Ni+V) based on the whole crude. There is no physical upper limit on metals concentrations contemplated for use herein.

The heavy oils usually contain relatively large amounts of sulfur which is advantageously reduced by the method of the present invention.

Reaction Conditions

The reactor can be of the fixed bed type or a fluidized or moving bed reactor. A trickle bed type reactor is preferred.

Processing may be carried out at a temperature of from about 500° F. to about 1200° F., a pressure of from about 0 psig to about 4000 psig, and a weight hourly space velocity (WHSV) of from about 0.1 to about 10 hr-1.

Processing conditions preferably include a temperature range of from about 600° to about 1000° F., a pressure of from 500 to about 2500 psig, and a WHSV of from about 0.2 to about 5 hr$^{-1}$.

Hydrogen circulation can range from about zero to about 40,000 SCF H$_2$/bbl of feed depending on hydrogenation activity. Typically, the range of hydrogen consumption of the present method is from about 300 SCF/bbl to about 6000 SCF/bbl.

The feed is initially heated to render it fluid so that is can be piped into the reactor.

Hydrotreating Catalyst

The activated carbon hydrotreating catalyst of the present invention possesses a pore volume in the 100Å to 400Å pore diameter range of at least about 0.08 cc/g and preferably at least about 0.2 cc/g and an average pore diameter of from about 15Å to about 100Å and preferably from about 40Å to about 90Å. The catalyst possesses a molybdenum component and a cobalt component which are preferably sequentially incorporated into the activated carbon, the molybdenum or tungsten component being incorporated prior to cobalt or nickel.

The catalyst composition of the present invention may be used in a reactor bed or it may be finely dispersed in the petroleum resid and thereafter removed from the product by separation processes such as filtration. It is preferable to use a bed reactor since the additional separation step(s) are not required. Moreover, it is advantageous to employ a down flow reactor in which the fluid stream to be treated flows downward through the bed. Downflow requires that the catalyst be packed in a fixed bed. Advantageously, the activated carbon possesses the additional properties set forth as follows:

| | Broad Range | Preferred |
|---|---|---|
| Crush Strength, lbs | at least about 8.0 | at least about 11.0 |
| Surface area, m$^2$/g | at least about 100 | 200–800 |
| Real density, g/cc | 1.9–2.2 | 1.9–2.2 |
| particle density, g/cc | 0.6–1.0 | 0.6–1.0 |
| Mesh Size | 2–100 | 4–20 |
| Alpha Value | 2.9–7 | 3.0–6 |
| Pore area in the 100Å to 400Å pore diameter range m$^2$/g | at least about 18 | at least about 50 |

Average pore diameter and other above properties are determined by the following methods:

Real density was determined by gas pychnometry using a Micromeritics Autopychnometer 1320.

The particle density of a catalyst or similar porous material can be determined by measuring the amount of mercury necessary to fill a container of known volume after a sample of known weight has been introduced. Mercury does not "wet" most porous solids and, as a result, will not enter its pores. In this method, mercury is allowed to flow into the sample tube under atmospheric pressure (14.7 psia). At this pressure only pores with a diameter, d, greater than about 150,000 Å, or 15 microns, will be filled. This estimate of minimum pore diameter is based on the following equation:

$$d = (4\ \gamma \cos \theta) \div P$$

where $\gamma$ is the surface tension of mercury, $\theta$ is the wetting or contact angle of mercury, and P is the pressure applied to mercury for pore penetration. This equation reduced to:

$$d = 215.1 \div P = 215.1 \div 14.7 \simeq 15\ \text{microns}$$

where d and P are expressed in units of microns and psia, respectively.

The pore volume is determined as follows:

$$\text{Pore Volume, cc/g} = \frac{1}{(D_p)} - \frac{1}{(D_r)}$$

where $D_p$ = particulate density, g/cc
$D_r$ = real density, g/cc

Calculation of the average pore diameter is determined as follows:

$$\text{Average Pore Diameter, Å} = \frac{PV \times 4 \times 10^4}{SA}$$

where

PV = pore volume, cc/g
SA = surface area, m$^2$/g

The surface area, expressed as m$^2$/g, was determined by the amount of a monomolecular layer of N$_2$ adsorbed onto a sample between ice and liquid N$_2$ temperature. A Micromeritics 2200 Surface Area Analyzer was used for this measurement.

A Micromeritics Digisorb 2600 instrument was used to determine pore diameter distribution. The adsorption and desorption isotherms for nitrogen at different pressures were plotted and pore size and pore area distribution were calculated.

When Alpha value is examined, it is noted that Alpha value is an approximate measure of the catalytic cracking activity of a catalyst compared with a standard catalyst and it gives the relative rate constant (rate of normal hexane conversion per volume of catalyst per unit time). It is based on the activity of the highly active silica-alumina cracking catalyst taken as an Alpha of 1 (Rate Constant=0.016 sec$^{-1}$). The Alpha value test is described in U.S. Pat. No. 3,354,078 in the *Journal of Catalysis*, Vol. 4, p. 527 (1965); Vol. 6, p. 278 (1966); and Vol. 61, p. 395 (1980), each incorporated by reference as to that description. The experimental conditions of the test used herein include a constant temperature of 538° C. and a variable flow rate as described in detail in the *Journal of Catalysis*, Vol. 61, p. 395. Alpha values were measured in atmospheres of helium and hydrogen.

The pore volume distribution is an important factor to consider with respect to the catalytic properties of activated carbons. It has been found that the pore volume distribution in the 79Å to 500Å pore diameter range is particularly important with respect to treating processes for heavy oil to facilitate the catalytic reaction or large oil molecules. Heavy oils contain molecules with diameters greater than 50Å, a significant percentage of which have diameters in the 200Å to 400Å range. Large pores in the catalyst can accommodate the molecules of this size range, thereby facilitating demetallation, desulfurization, catalytic cracking and hydrogenation at the pore sites.

The activated carbon component of the catalyst employed in this invention can be prepared from lignite. Coals, such as anthracite, bituminous coal, and lignite are classified according to moist, mineral-matter-free energy content in accordance with the measuring requirements set by ASTM Standard D 388. In this method of classification, lignite has a moist energy of less than 8300 BTU/lb. A lignite based activated carbon suitable for use in the method of the present invention is Darco ® brand carbon available from American Norit Company, Inc., of Jacksonville, Fla. Another suitable activated carbon, also derived from lignite, is designated as Petrodarco A ™ and is also available from American Norit Company, Inc.

Not all types of lignite based activated carbons possess the requisite pore distribution properties. For example, Alfa ™ activated carbon (available from Alfa Products, of Danvers, Mass.) is a lignite based activated carbon which possesses relatively poor pore distribution properties.

Non-lignite based activated carbons may also be used in the method of the present invention. For example, a peat based activated carbon designated as Norit Rox ™ 0.8 ™ is available from American Norit Company and possesses suitable pore distribution properties for the method of the present invention.

Another factor influencing the catalytic properties of activated carbons is the chemical composition. The elemental analysis of Darco ® carbon (Table 5 below) as compared with that of Alfa ™ carbon (Table 7, below) shows that Darco ® carbon has three times more alumina and eight times more silica than the Alfa ™ carbon. The increased level of silica and alumina Darco ® carbon are believed to yield increased acid cracking activity.

Table 1 sets forth the pore distribution comparison of Darco ® carbon, Alfa ™ carbon, and alumina, Petrodarco A ™ carbon, and Norit Rox ™ 0.8 carbon. Both the incremental pore volumes and incremental pore areas are compared As can be seen, Darco ® carbon has significant catalyst surface area in the 70Å to 300Å range.

Table 2 sets forth pore distribution comparison data for Co/Mo impregnated Darco ® and Alfa ™ carbons. These data show that Co/Mo Darco ® has significant pore volume and area in the 70Å–300Å range, which is an important consideration when processing heavy oil.

More particularly, Table 3 sets forth the pore volumes and pore areas in the 100Å to 400Å pore diameter range. For example, comparing pore area in the 100Å to 400Å pore diameter range (see Table 3), Darco ® carbon has a pore area of 52.103 sq.m./g whereas Alfa ™ carbon has 1.226 sq.m./g in the same range and alumina has a pore area of 6.165 sq.m./g in the same pore diameter range. With respect to pore volume, Darco ® carbon has a pore volume of 0.205864 cc/g in the 100Å to 400Å pore diameter range, whereas Alfa ™ carbon has a 0.005136 cc/g in that range, and alumina has a pore volume of 0.02422 cc/g in the 100Å to 400Å pore diameter. With cobalt/molybdenum impregnation CoMo/-Darco ® exhibits a pore area of 41 sq.m./g, and a pore volume of 0.1663 cc/g in the 100Å to 400Å pore diameter range. Table 3 shows that while CoMo impregnation somewhat reduces the pore volume and pore area of Darco ® carbon in the 100Å to 400Å range there is still an advantageous pore size distribution.

TABLE 1

DESORPTION PORE DISTRIBUTION
Compared with Incremental Pore Volume and Pore Area

| Pore Diameter Range Å | Average Diameter Å | Darco ® | Alfa ™ | Alumina | Petrodarco A ™ | Norit Rox ™ 0.8 |
|---|---|---|---|---|---|---|
| | | Incremental Pore Volume (cc/g) | | | | |
| 600–400 | 500 | 0.013834 | 0.000881 | 0.002497 | 0.01252 | 0.022464 |
| 400–200 | 300 | 0.064484 | 0.002089 | 0.005023 | 0.079431 | 0.045689 |
| 200–150 | 175 | 0.057187 | 0.001069 | 0.003172 | 0.051155 | 0.017227 |
| 150–100 | 125 | 0.084193 | 0.001978 | 0.016025 | 0.074010 | 0.023003 |
| 100–50 | 75 | 0.160760 | 0.005918 | 0.336205 | 0.124958 | 0.037725 |
| 50–30 | 40 | 0.190746 | 0.022680 | 0.038918 | 0.141874 | 0.105704 |
| 30–15 | 22.5 | 0.100566 | 0.180786 | 0.005537 | 0.074099 | 0.124613 |
| Cumulative Pore Volume, (cc/g): | | 0.671769 | 0.215345 | 0.407376 | 0.558050 | 0.376425 |
| | | Incremental Pore Area (sq. m/g) | | | | |
| 600–400 | 500 | 1.162 | 0.071 | 0.214 | 1.544 | 1.888 |
| 400–200 | 300 | 10.105 | 0.305 | 0.750 | 12.210 | 6.881 |
| 200–150 | 175 | 13.472 | 0.253 | 0.761 | 12.090 | 4.056 |

TABLE 1-continued

DESORPTION PORE DISTRIBUTION
Compared with Incremental Pore Volume and Pore Area

| Pore Diameter Range Å | Average Diameter Å | Darco ® | Alfa ™ | Alumina | Petrodarco A ™ | Norit Rox ™ 0.8 |
|---|---|---|---|---|---|---|
| 150–100 | 125 | 28.526 | 0.668 | 4.654 | 24.818 | 7.712 |
| 100–50 | 75 | 94.409 | 3.049 | 204.270 | 72.949 | 22.023 |
| 50–30 | 40 | 197.159 | 25.015 | 38.087 | 146.081 | 111.403 |
| 30–15 | 22.5 | 200.417 | 404.435 | 9.058 | 148.220 | 262.675 |
| Cumulative Pore Volume, (sq. m/g): | | 545.250 | 433.797 | 257.795 | 417.912 | 416.638 |

TABLE 2

CoMo ON ACTIVATED CARBON
Desorption Pore Distribution

| Pore Diameter Range (Å) | Average Diameter (Å) | Incremental Pore Vol (cc/g) | Cumulative Pore Vol (cc/g) | Incremental Pore Area (sq. m/g) | Cumulative Pore Area (sq. m/g) |
|---|---|---|---|---|---|
| Co/Mo Darco ® Carbon | | | | | |
| 600–400 | 500 | 0.011864 | 0.011864 | 0.996 | 0.996 |
| 400–200 | 300 | 0.054064 | 0.065928 | 8.584 | 9.580 |
| 200–150 | 175 | 0.045044 | 0.110972 | 10.631 | 20.210 |
| 150–100 | 125 | 0.067192 | 0.178163 | 22.608 | 42.818 |
| 100–50 | 75 | 0.124167 | 0.302330 | 72.910 | 115.728 |
| 50–30 | 40 | 0.144508 | 0.446839 | 148.471 | 264.199 |
| 30–15 | 22.5 | 0.056684 | 0.503528 | 111.886 | 376.084 |
| Co/Mo Alfa ™ Carbon | | | | | |
| 600–400 | 500 | 0.001542 | 0.001542 | 0.141 | 0.141 |
| 400–200 | 300 | 0.002465 | 0.004007 | 0.373 | 0.513 |
| 200–150 | 175 | 0.001198 | 0.005205 | 0.277 | 0.790 |
| 150–100 | 125 | 0.001708 | 0.006913 | 0.585 | 1.376 |
| 100–50 | 75 | 0.005562 | 0.012475 | 3.097 | 4.473 |
| 50–30 | 40 | 0.019280 | 0.031855 | 21.073 | 25.546 |
| 30–15 | 22.5 | 0.157588 | 0.189443 | 353.340 | 388.886 |

TABLE 3

Pore Volumes and Pore Areas in the 100Å to 400Å Pore Diameter Range

| | Pore Volume (cc/g) | Pore Area sq.m./g |
|---|---|---|
| Darco ® | 0.205864 | 52.103 |
| Petrodarco A ™ | 0.204596 | 49.118 |
| Norit Rox ™ 0.8 | 0.085919 | 18.649 |
| Alfa ™ | 0.005136 | 1.226 |
| Alumina | 0.02422 | 6.165 |
| CoMo/Darco ® | 0.166300 | 41.823 |
| CoMo/Alfa ™ | 0.005371 | 1.235 |

One surprising result is the effectiveness of a relatively small average pore diameter. Compared with cobalt-molybdenum on alumina (CoMo/Al$_2$O$_3$), which has an average pore diameter of over 70Å, Darco ® carbon has an average pore size of about 54Å.

Yet another surprising result is the superiority of preparing cobalt-molybdenum/activated carbon catalysts wherein the molybdenum is impregnated first as opposed to those catalysts in which the cobalt and molybdenum are co-impregnated onto activated carbon.

When CoMo/alumina catalysts are prepared, the molybdenum must be put down first to prevent the cobalt from forming cobalt-aluminum spinel structures. Many oxide species form on the CoMo/alumina during air calcination in the preparation of the catalyst and these species are converted into sulfides when the catalyst is subsequently sulfided. Since activated carbon cannot form spinel structures and no air oxidation can be used during the preparation because of carbon catalyst oxidation with subsequent crumbling, the sequence of metal impregnation would seemingly be of less importance.

Contrary to this expectation, it has been found that there is, in fact, a difference in activity of CoMo/activated carbon catalysts which is dependent on the sequence of metal impregnation. Results show that a catalyst composition prepared by putting down the molybdenum component first followed by the cobalt component produces a catalyst capable of 5-10% greater demetallation, about 15% more 1000° F.+ conversion, 5% greater CCR reduction, and 10-13% more desulfurization activity, as opposed to a catalyst composition in which the molybdenum component and cobalt component are put down at the same time.

The following examples illustrate a comparison of the catalyst of the present invention, as compared with CoMo/Al$_2$O$_3$, with respect to the demetallation of 650° F.+ residue feedstock. CoMo/Al$_2$O$_3$ is a commonly used catalyst for hydroprocessing. The results show that cobalt-molybdenum impregnated lignite based activated carbons compare favorably with CoMo/Al$_2$O$_3$ in term of the effectiveness of converting high boiling fractions of the feedstock, and in terms of demetallation and reduction of Conradson Carbon Residue. Use of activated carbon is advantageous because it is less expensive than CoMo/Al$_2$O$_3$ and the removed metals can be easily recovered by oxidizing the catalyst after use.

Another feature of the method of the present invention is the use of water soluble salts to impregnate the activated carbon. It has been found that activated carbon which has been impregnated with ammonium paramolybdate exhibits superior hydrodesulfurization ability and reduced coke production during the hydroprocessing of petroleum resins. Such a catalyst may be used in a reactor bed, or it may be dispersed in the petroleum resid such that it flows out with the product. In the latter situation some form of separation (e.g., filtration) is required to remove the catalyst from the product for recycle and/or recovery of the metal. With the use of activated carbon, metal recovery may be achieved by burning away the carbon.

Catalytic effectiveness is facilitated by fine dispersion of the metal component on the catalyst and this can be achieved by impregnation of molybdenum or other catalytic metals onto activated carbon by soaking the activated carbon in an aqueous solution of metal salt. The metal exists as a finely divided catalytically active compound impregnated into relatively larger carbon particles.

This activated carbon/metal catalyst produces hydroprocessing results equivalent to catalyst metal added to petroleum resid simply as a decomposable organic compound such as metal naphthenate or metal hexacarbonyl, and offers the advantage of being less expensive and easier to make and use, as well as the flexibility of use in bedded or non-bedded reactors.

EXAMPLE 1

650° F.+ atmospheric distillation residue fraction was provided for use as feedstock in the following examples. The feedstock had the properties set forth in Table 4, below.

TABLE 4

650° F.+ Resid

| | |
|---|---|
| Carbon, % | 84.07 |
| Hydrogen, % | 10.65 |
| Nitrogen, % | 0.30 |
| Oxygen, % | 0.81 |
| Sulfur, % | 4.23 |
| CCR, % | 12.03 |
| Pentane insolubles, % | 15.97 |
| Nickel, ppm | 32 |
| Vanadium, ppm | 104 |
| B.P. Range °F. | Fraction |
| 420–650 | 2.50% |
| 650–850 | 29.25% |
| 850–1000 | 19.54% |
| 1000+ | 48.71% |

The feedstock of Table 4 was hydrotreated in a trickle bed micro unit reactor of standard design at 1500 psig $H_2$ partial pressure, 5800 SCF $H_2$/bbl. circulation, and 0.5 $hr^{-1}$ WHSV.

The trickle bed reactor was charged with 11.23 grams of catalyst and 30 cc of sand. The feed delivery was 5.8 cc/hr. Standard presulfiding of the catalyst was employed with 2% $H_2S$ in hydrogen. The run time and temperature protocol was as follows:
1) 750° F. for 7 days
2) 775° F. for 7 days
3) 750° F. for 2 days The micro unit reactor incorporated a bottoms receiver held at 200° C. to drive off volatiles; a 2° C. liquid cooled trap condensed low boiling component. Gas samples were analyzed with a gas sampling system with bombs. Off gas volumes were measured with a wet test meter.

A $CoMo/Al_2O_3$ catalyst was provided, the catalyst having the properties shown in Table 5 below.

The catalyst was a commercial Ketjen catalyst and was prepared with conventional methodology with the molybdenum incorporated first to prevent the cobalt from forming cobalt-aluminum spinal structures.

The feedstock was hydroprocessed with the $CoMo/Al_2O_3$ catalyst and the demetallation results are set forth in Table 6 below.

TABLE 5

| $CoMo/Al_2O_3$ Catalyst Properties | |
|---|---|
| Co % | 2.4 |
| Mo % | 8.4 |
| Surface Area, m²/g | about 256 |
| Real Density, g/cc | 3.419 |
| Particle Density g/cc | 1.238 |
| Pore Volume, cc/g | 0.515 |
| Average Pore Diameter, Å | 71 |
| Alpha Value | 9.8 |
| Co atoms/nm² | 0.85 |
| Mo atoms/nm² | 1.81 |

TABLE 6

Hydroprocessing Results For $CoMo/Al_2O_3$

| Sample No. | °F. | t(days) | % Conversion[1] | % deM[2] | % deS[3] | deNi[4] | deV[5] | deCCR[6] |
|---|---|---|---|---|---|---|---|---|
| 1) | 750 | 1.7 | 42.50 | 67.9 | 83.5 | 58.4 | 70.8 | 52.0 |
| 2) | 750 | 6.9 | 35.03 | 62.9 | 80.8 | 49.5 | 67.1 | 47.2 |
| 3) | 775 | 8.7 | 55.55 | 76.3 | 84.6 | 68.3 | 78.8 | 56.9 |
| 4) | 775 | 15.3 | 49.77 | 70.6 | 80.6 | 56.4 | 74.9 | 49.5 |
| 5) | 750 | 16.7 | 35.66 | 55.7 | 71.9 | 37.2 | 61.4 | 42.4 |

[1]Percent reduction of 1000° F.+ fraction in feed.
[2]Percent Total Demetallation (Ni + V removal)
[3]Percent Desulfurization
[4]Percent Nickel removal
[5]Percent Vanadium removal
[6]Percent Conradson Carbon Residue reduction

EXAMPLE 2

A CoMo/activated carbon catalyst was prepared by coimpregnating cobalt and molybdenum on Alfa TM brand activated carbon. The following methodology was employed.

A quantity of 6–8 mesh Alfa TM carbon was provided. The Alfa TM carbon has the properties as set forth in Table 7 below.

A quantity of 11.84 grams of cobalt nitrate, (i.e., Co($NO_3)_2.6H_2O$) and 15.45 grams of ammonium paramolybdate, i.e. $(NH_4)_6Mo_7O_{24}.4H_2O$, were dissolved in 40 ml $H_2O$ and 89.2 grams of 6–8 mesh Alfa TM activated carbon pellets were added.

The catalyst pellets were then calcined in a nitrogen atmosphere by heating at the rate of 5° C./min up to 150° C., holding the 150° temperature for 3 hours, then increasing the temperature at the rate of 5° C./min up to 500° C. and holding the 500° C. temperature for 10 hours. The catalyst weighed 97.33 grams after calcining and had the properties set forth in Table 8 below.

The feedstock of Example 1 was hydroprocessed in a trickle bed reactor under the same conditions as those of Example 2 with the exception that 11.28 grams of coimpregnated CoMo/Alfa TM activated carbon was used as the catalyst. The results of the hydroprocessing are set forth below in Table 9.

TABLE 7

Alfa ™ Carbon Properties
(6-8 Mesh Alfa ™ Carbon)

| | |
|---|---|
| Surface Area m²/g | 946 |
| Real Density, g/cc | 2.072 |
| Particle Density, g/cc | 1.023 |
| Pore Volume, cc/g | 0.495 |
| Average Pore Diameter, Å | 20 |
| Alpha Value | 3.6 |
| C, % | 90.42 |
| H, % | <0.5 |
| N, % | 0.93 |
| S, % | 0.87 |
| Ash % | 3.39 |
| Fe, % | 0.33 |
| $Al_2O_3$, % | 1.05 |
| $SiO_2$, % | 1.29 |
| Cu (ppm) | 0.047 |
| K (ppm) | 0.024 |
| Ni (ppm) | 29 |
| V (ppm) | 49 |
| Cr (ppm) | 66 |
| Cl (ppm) | <13 |
| Na (ppm) | 612 |

TABLE 8

CATALYST PROPERTIES
(Properties of 6-8 Mesh CoMo/Alfa ™ Activated Carbon
prepared by coimpregnation)

| | |
|---|---|
| Co, % | 1.9 |
| Mo, % | 7.0 |
| Surface Area m²/g | 796 |
| Real Density, g/cc | 2.383 |
| Particle Density, g/cc | 0.662 |
| Pore Volume, cc/g | 1.091 |
| Average Pore Diameter, Å | 58 |
| Cobalt atoms/nm² | 0.26 |
| Molybdenum atoms/nm² | 0.56 |

TABLE 9

Hydroprocessing Results For
Coimpregnated Co/Mo/Activated Carbon

| Sample No. | °F. | t(days) | % Conversion | % deM | % deS | deNi | deV | deCCR |
|---|---|---|---|---|---|---|---|---|
| 1) | 750 | 1.9 | 24.94 | 41.2 | 55.8 | 31.9 | 45.3 | 32.0 |
| 2) | 750 | 6.8 | 24.38 | 41.8 | 50.8 | 25.5 | 46.8 | 29.8 |
| 3) | 775 | 8.9 | 37.65 | 53.9 | 59.3 | 45.3 | 56.6 | 37.4 |
| 4) | 775 | 14.9 | 36.13 | 53.0 | 57.4 | 47.9 | 54.6 | 37.7 |
| 5) | 750 | 16.9 | 17.91 | 38.5 | 44.7 | 33.9 | 39.9 | 24.4 |

EXAMPLE 3

A CoMo/activated carbon catalyst was prepared by sequentially impregnating molybdenum and cobalt on Alfa ™ activated carbon in accordance with the following methodology.

A quantity of 7.73 grams of ammonium paramolybdate, i.e., $(NH_4)_6 Mo_7O_{24} \cdot 4 H_2O$, was dissolved in 20 ml $H_2O$, and impregnated on 44.60 grams of 6-8 mesh Alfa ™ activated carbon pellets. The pellets were then dried in a vacuum oven at 100° C. for about 5 hours to create a molybdenum impregnated catalyst.

Next, a quantity of 5.92 grams of cobalt nitrate, i.e., $Co(NO_3)_2 \cdot 6 H_2O$, was dissolved in 30 cc of $H_2O$ and impregnated onto the molybdenum impregnated catalyst of the above step. The resulting cobalt-molybdenum impregnated catalyst was then air dried overnight at 100° C. and then vacuum dried at 100° C. for 5 hours in a vacuum oven.

The resulting catalyst had the properties as set forth in Table 10 below.

The feedstock of Example 1 was hydroprocessed in a trickle bed reactor under the same conditions of Example 2 except that 11.28 grams of the sequentially impregnated CoMo/activated carbon of this example was employed as the catalysts. The hydroprocessing results are set forth in Table 11 below.

TABLE 10

Properties of Sequentially Impregnated
CoMo/Alfa ™ Activated Carbon Catalyst

| | |
|---|---|
| Co, % | 2.02 |
| Mo, % | 7.71 |
| Surface Area m²/g | 726 |
| Real Density, g/cc | — |
| Particle Density, g/cc | — |
| Pore Volume, cc/g | — |
| Average Pore diameter, Å | — |
| Cobalt atoms/nm² | — |
| Mo atoms/nm² | — |

TABLE 11

Hydroprocessing Results For Sequentially
Impregnated Co/Mo/Alfa ™ Activated Carbon Catalyst

| Sample No. | °F. | t(days) | % Conversion | % deM | % deS | deNi | deV | deCCR |
|---|---|---|---|---|---|---|---|---|
| 1) | 750 | 2.3 | 37.77 | 47.8 | 66.9 | 32.9 | 52.4 | 36.8 |
| 2) | 750 | 6.7 | 38.54 | 48.2 | 62.6 | 26.7 | 54.8 | 34.4 |
| 3) | 775 | 8.7 | 57.66 | 58.1 | 72.8 | 35.0 | 65.2 | 44.2 |
| 4) | 775 | 14.7 | 53.57 | 57.8 | 68.0 | 48.8 | 60.0 | 42.5 |
| 5) | 750 | 16.8 | 30.83 | 44.3 | 55.1 | 37.8 | 46.3 | 31.5 |

EXAMPLE 4

A CoMo/activated carbon catalyst was prepared by sequentially impregnating molybdenum and cobalt on Darco ® activated carbon in accordance with the following methodology.

A quantity of Darco ® carbon was provided. The Darco ® carbon had the properties as set forth below in Table 12.

A quantity of 7.73 grams of ammonium paramolybdate, i.e., $(NH_4)_6 Mo_7O_{24} \cdot 4 H_2O$, was dissolved in 50 ml $H_2O$, and impregnated on 44.60 grams of 12/20 mesh Darco ® activated carbon pellets. The pellets were then dried in a vacuum oven at 100° C. for about 24 hours to create a molybdenum impregnated catalyst.

Next, a quantity of 5.92 grams of cobalt nitrate, i.e., $Co(NO_3)_2 \cdot 6 H_2O$, was dissolved in 55 ml of $H_2O$ and impregnated onto the molybdenum impregnated catalyst of the above step. The resulting cobalt-molybdenum impregnated catalyst was then air dried overnight at 100° C. and then vacuum dried at 100° C. for 5 hours in a vacuum oven.

The resulting catalyst had the properties as set forth in Table 13 below.

The feedstock of Example 1 was hydroprocessed in a trickle bed reactor under the same conditions of Example 2 except that 11.28 grams of the sequentially impregnated CoMo/activated carbon of this example was employed as the catalyst. The hydroprocessing results are set forth in Table 14 below.

TABLE 12

DARCO ® PROPERTIES
(6–8 Mesh Darco ® Carbon)

| | |
|---|---|
| Surface Area $m^2/g$ | 712 |
| Real Density, g/cc | 1.990 |
| Particle Density, g/cc | 0.676 |
| Pore Volume, cc/g | 0.977 |
| Average Pore Diameter, Å | 54 |
| Alpha Value | 2.9 |
| C, % | 81.08 |
| H, % | 1.08 |
| N, % | 7.60 |
| S, % | 0.48 |
| Ash % | 10.04 |
| Fe, % | 0.25 |
| $Al_2O_3$, % | 3.45 |
| $SiO_2$, % | 9.99 |
| Cu (ppm) | 40 |
| K (ppm) | .0025 |
| Ni (ppm) | 16 |
| V (ppm) | 37 |
| Cr (ppm) | 15 |
| Cl (ppm) | 1747 |
| Na (ppm) | 1103 |

TABLE 13

Properties of Sequentially Impregnated
CoMo/Darco ® Activated Carbon Catalyst

| | |
|---|---|
| Co, % | 3.77 |
| Mo, % | 9.26 |
| Surface Area $m^2/g$ | 459 |
| Real Density, g/cc | 2.142 |
| Particle Density, g/cc | .821 |
| Pore Volume, cc/g | .751 |

TABLE 13-continued

Properties of Sequentially Impregnated
CoMo/Darco ® Activated Carbon Catalyst

| | |
|---|---|
| Average Pore diameter, Å | 65 |
| Cobalt atoms/$nm^2$ | 0.84 |
| Molybdenum atoms/$nm^2$ | 1.27 |

TABLE 14

Hydroprocessing Results For Sequentially
Imregnated CoMo/Darco ® Activated Carbon Catalyst

| Sample No. | °F. | t(days) | % Conversion | % deM | % deS | deNi | deV | deCCR |
|---|---|---|---|---|---|---|---|---|
| 1) | 750 | 1.8 | 34.04 | 84.3 | 66.7 | 69.1 | 87.5 | 37.6 |
| 2) | 750 | 6.8 | 35.47 | 79.8 | 57.7 | 70.3 | 82.7 | 33.3 |
| 3) | 775 | 8.8 | 52.19 | 86.6 | 64.3 | 68.7 | 92.1 | 43.2 |
| 4) | 775 | 14.8 | 47.89 | 86.7 | 60.3 | 72.1 | 91.2 | 39.1 |
| 5) | 750 | 16.8 | 29.67 | 71.5 | 46.6 | 58.7 | 75.5 | 25.1 |

EXAMPLE 5

A CoMo/activated shot coke catalyst was prepared by coimpregnating cobalt and molybdenum on a partially oxidized shot coke in accordance with the following methodology:

A quantity of 6.63 grams of cobalt nitrate $(CO(NO)_2 \cdot 6H_2O)$ and 8.66 grams ammonium paramolybdate $((NH_4)_6 Mo_7O_{24} \cdot 6H_2O)$ were dissolved in 22.42 ml $H_2O$. A quantity of 50 grams of 10% oxidized shot coke was added to this solution and the excess water evaporated from the coke under reduced pressure.

The CoMo/10% oxidized shot coke was then dried in a vacuum oven at 100° for 5 hours. It was the further oxidized an additional 20% by air oxidation in a tube furnace at 450° C. for 16 hours with a flow rate of 11 cc/min air, followed by nitrogen for 16 hours.

The resulting CoMo/30% oxidized shot coke catalyst had the properties as set forth in Table 15 below.

The feedstock of Example 1 was hydroprocessed in a trickle bed reactor under the same conditions of Example 2 except that 11.23 grams of coimpregnated CoMo/30% oxidized shot coke was employed as the catalyst. The hydroprocessing results are set forth in Table 16 below.

TABLE 15

Properties of Coimpregnated
CoMo/30% Oxidized Shot Coke Catalyst

| | |
|---|---|
| Co, % | 5.3 |
| Mo, % | 17.8 |
| Surface Area $m^2/g$ | 44 |
| Real Density, g/cc | — |
| Particle Density, g/cc | — |
| Pore Volume, cc/g | — |
| Average Pore diameter, Å | ~16 |
| Cobalt atoms/$nm^2$ | 12.3 |
| Molybdenum atoms/$nm^2$ | 41.2 |

TABLE 16

Properties of Coimpregnated
CoMo/30% Oxidized Shot Coke Catalyst

| Sample No. | °F. | t(days) | % Conversion | % deM | % deS | deNi | deV | deCCR |
|---|---|---|---|---|---|---|---|---|
| 1) | 750 | 1.6 | 12.73 | 12.8 | 8.1 | 8.1 | 14.3 | 8.1 |
| 2) | 750 | 6.7 | 14.58 | 14.1 | 5.0 | 5.0 | 17.0 | 9.1 |
| 3) | 775 | 8.6 | 26.04 | 20.2 | 14.7 | 7.0 | 24.3 | 13.1 |
| 4) | 775 | 14.8 | 26.68 | 22.8 | 14.2 | 15.7 | 25.0 | 12.2 |
| 5) | 750 | 16.7 | 9.09 | 20.5 | 9.0 | 26.3 | 18.8 | 7.3 |

Figure 2:
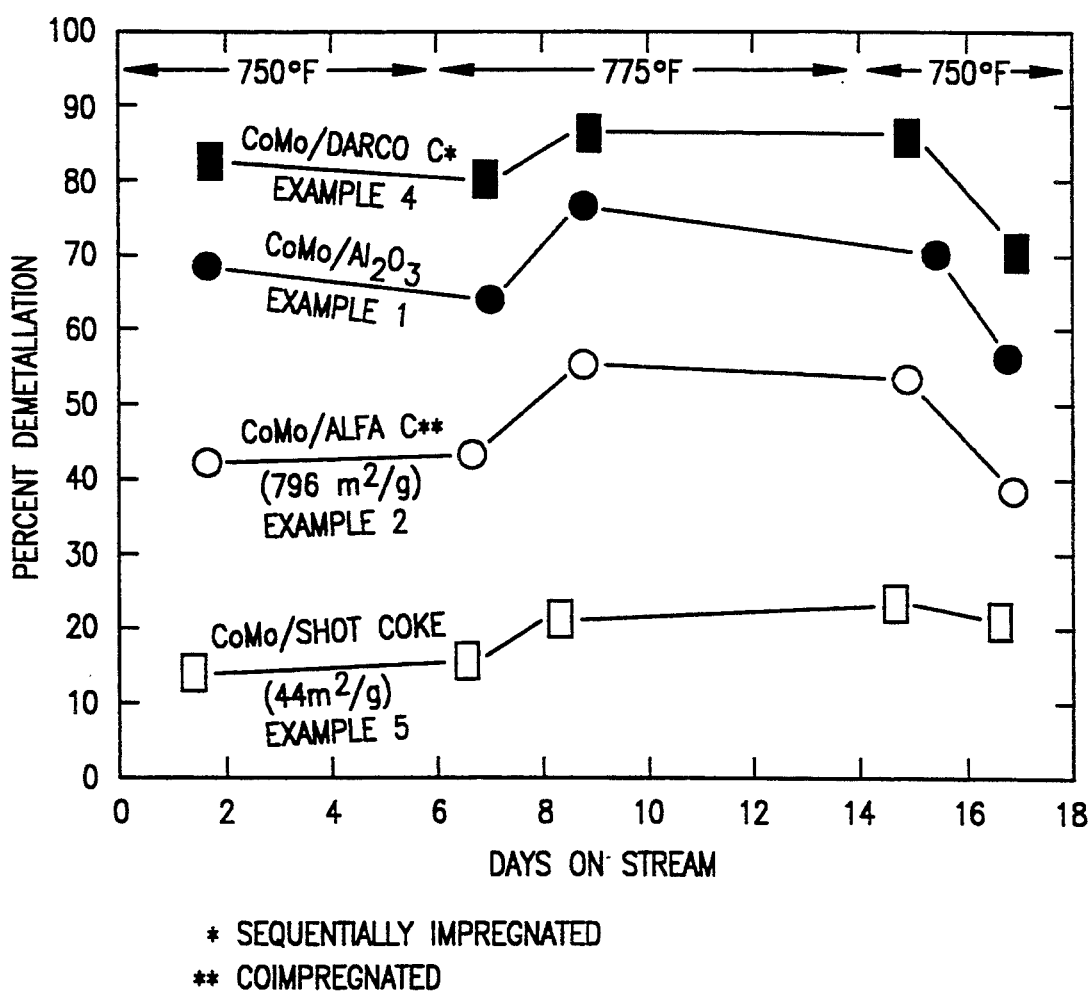
FIG. 2 graphically illustrates demetallation results of activated carbons impregnated with cobalt and molybdenum in comparison with impregnated alumina and impregnated shot coke.
Figure 3:
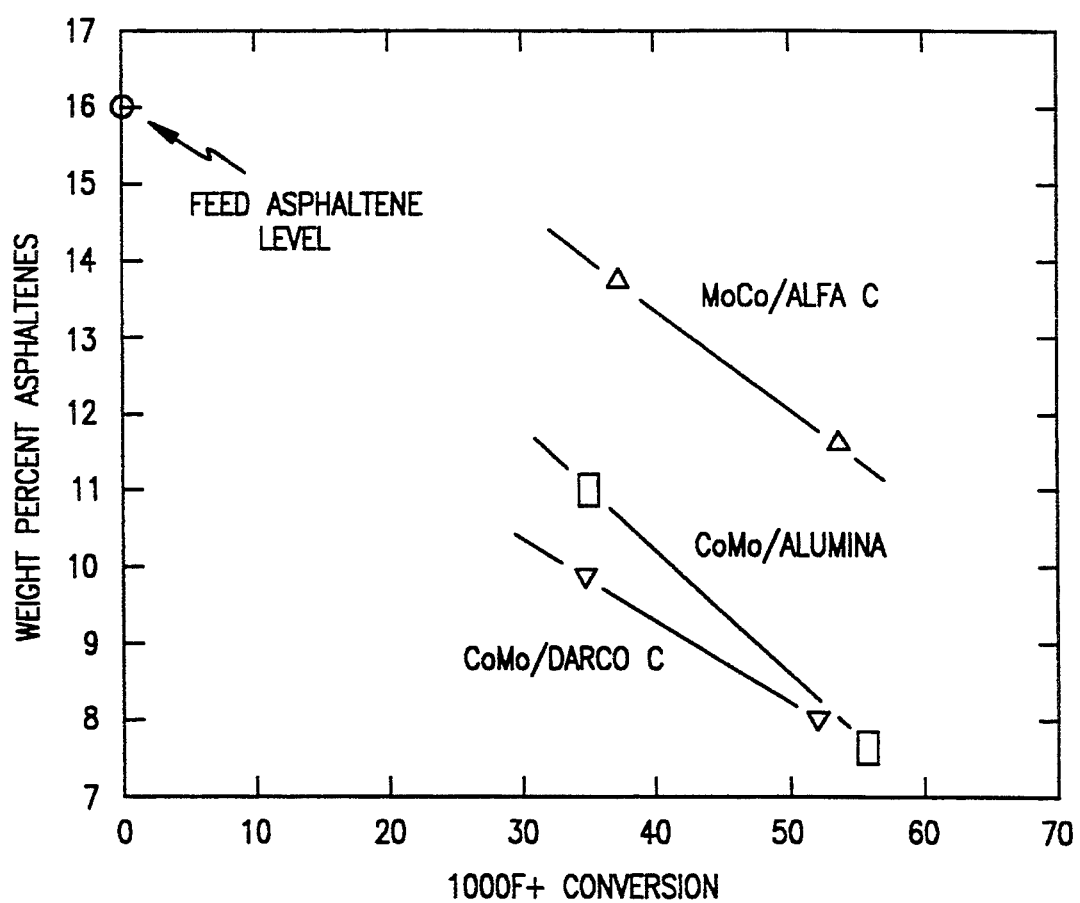
FIG. 3 graphically illustrates asphaltene reduction at various levels of 1000° F.+ fraction conversion of 650° F.+ residue.

Referring now to FIGS. 1, 2, and 3, FIG. 1 graphically illustrates the improved results obtained by sequential impregnation of molybdenum and cobalt on an activated carbon catalyst as opposed to coimpregnation. Specifically, the demetallation and conversion results of Tables 9 and 11 are compared for the coimpregnated Alfa ™ carbon catalyst of Example 2 and the sequentially impregnated Alfa ™ carbon catalyst of Example 3. For example, after about 2 days on stream the coimpregnated Alfa ™ carbon catalyst exhibited a 24.94% conversion of 1000° F.+ fraction in the feed whereas the sequentially impregnated catalyst of Example 4 exhibited a 37.77% conversion. Improved demetallation was also exhibited. The improvement in results was apparent throughout the entire run length of 17 days on stream.

FIG. 2 illustrates the results of demetallation of the catalysts of Examples 1, 2, 4 and 5 presented above. As can be seen from FIG. 2, Darco ® carbon with sequentially impregnated molybdenum and cobalt produced results superior even to CoMo/alumina.

FIG. 3 is a graph illustrating the reduction of asphaltenes* at various levels of 1000° F.+ fraction conversion. The feedstock, 650° F.+ residue, has an initial asphaltene level of 15.97% (see Table 4). With a CoMo/Darco ® carbon catalyst (Mo applied first, Co applied second) the asphaltene level dropped to below 10% at 35% conversion, and to about 8% at 52% conversion. This reduction in asphaltene level was superior to that achieved by CoMo/Alumina or sequentially impregnated CoMo/Alfa ™ carbon. The ability of the CoMo/Darco ® carbon to produce more asphaltene conversion is believed to be attributable to the pores in the 100Å to 400Å range, and the silica-alumina cracking potential of Darco ® carbon.

* Asphaltenes, i.e. pentane insolubles, are precipitated by using 10:1 pentane:oil)

EXAMPLE 6 to 12

A vacuum distillation residue fraction was provided for use as the feedstock in the following example. The feedstock had the properties set forth in Table 17 below.

TABLE 17

| Vacuum Resid Properties | |
|---|---|
| Carbon, % | 83.6 |
| Hydrogen, % | 9.3 |
| Nitrogen, % | 0.8 |
| Oxygen, % | 0.5 |
| Sulfur, % | 5.8 |
| CCR, % | 27.3 |
| Nickel, ppm | 121 |
| Vanadium, ppm | 587 |

TABLE 17-continued

| Vacuum Resid Properties | |
|---|---|
| BP Range °F. | |
| 75–400° F. | 0.0 |
| 400–800° F., wt % | 0.8 |
| 800–1050° F., wt % | 10.8 |
| 1050° F.+, wt % | 86.4 |

EXAMPLES 7 TO 12

The feedstock of Table 17 was mixed with catalyst and the mixture was autoclaved at 785° F. for 150 minutes with 2000 psig $H_2$. Catalysts employed were as follows:

| Example | Catalyst |
|---|---|
| 7 | No catalyst was employed |
| 8 | $FeMoO_4$ |
| 9 | 100 mesh molybdenum powder |
| 10 | Activated carbon with molybdenum impregnated by soaking 100–300 mesh Darco ® carbon in aqueous ammonium para molybdate, then drying. |
| 11 | Molybdenum naphthenate |
| 12 | Molybdenum hexacarbonyl |

The results of this treatment are set forth in Table 18 below.

TABLE 18

Hydrocracking of Vacuum Resid
Effect of Activated Carbon and/or Molybdenum Addition
Autoclave results - 150 min., 785° F., 2000 psig $H_2$

| Example | 7 | 8 | 9 | 10 | 11 | 12 |
|---|---|---|---|---|---|---|
| Additive | None | $FeMoO_4$ | −100 Mesh Mo Powder | Activated C Impregnated w/542 ppm Mo | 200 ppm Mo as Mo Naphthenate | 650 ppm Mo as Hexacarbonyl |
| Wt 1050° F.+ Conversion | 61 | 62 | 66 | 60 | 64 | 60 |
| Coke Yield, wt % | 10.1 | 8.4 | 4.4 | 1.4 | 2.0 | 1.0 |
| $H_2S$ Yield, wt % | 1.5 | 1.5 | 1.8 | 2.6 | 2.0 | 2.3 |
| $H_2$ consumed | 98 | 364 | 533 | 801 | 895 | 668 |

The results show that activated carbon catalyst with molybdenum impregnated therein by soaking the carbon in an aqueous solution of a water soluble molybdenum compound (i.e. Example 10) produces superior desulfurization and reduced coke formation comparable to the more expensive molybdenum naphthenate and molybdenum hexacarbonyl catalysts. Results obtained for Example 10 were far superior to those obtained for Examples 7 to 9.

What is claimed is:

1. A process for hydrotreating a hydrocarbon oil feedstock characterized by a distillation boiling point range such that the fraction boiling at over 650° F. comprises at least 97% of the hydrocarbon oil, said process comprising contacting said feedstock under hydrotreating conditions including a temperature of between about 500° F. to about 1200° F., a pressure of from about 0 psig to about 4000 psig and a space velocity of about 0.1 to about 10-hr-1 WHSV in the presence of a catalyst composition comprising (a) an activated carbon component derived from lignite possessing a pore volume in the 100Å to 400Å pore diameter range of at least about 0.08 cc/g., and an average pore diameter of from about 15Å to 100Å, and (b) a molybdenum or tungsten component and (c) a cobalt or nickel component.

2. The process of claim 1, wherein said activated carbon component possesses a pore area in the 100Å to 400Å pore diameter range of at least about 18 square meters pear gram.

3. The process of claim 1, wherein said activated carbon component possesses a pore volume in the 100Å to 400Å pore diameter range of at least about 0.2 cc/g.

4. The process of claim 1, wherein said activated carbon component possesses a pore area in the 100Å to 400Å pore diameter range of at least about 50 square meters per gram.

5. The process of claim 1, wherein said activated carbon component possesses an Alpha value of at least about 2.9.

6. The process of claim 1, wherein said activated carbon component possesses an Alpha value of between 3.0 and 6.

7. The process of claim 1, wherein said activated carbon component possesses an average pore diameter of between 40Å and 60Å.

8. The process of claim 1, wherein said hydrocarbon oil feedstock is selected from the group consisting of atmospheric distillation residuum, tar sand oil, shale oil, or combinations thereof.

9. The process of claim 1, wherein said process is carried out in a fixed bed type reactor.

10. The process of claim 1, wherein said hydrotreating conditions include a temperature of between about 600° F. to 1000° F., a pressure of from about 500 psig to 2500 psig and a space velocity of from about 0.2 to 5 $hr^{-1}$ WHSV.

11. The process of claim 1, wherein said hydrotreating conditions include a temperature of between 700° to 900° F., a pressure of from about 1000 psig to 2000 psig, and a space velocity of from about 0.2 to 1.0 $hr^{-1}$ WHSV.

12. The process of claim 1, wherein said hydrotreating includes demetallation, desulfurization, and the reduction of carbon residue of the feedstock.

13. The process of claim 12, wherein said demetallation is characterized by at least a 23% reduction of the combined content of nickel and vanadium compounds present in the feedstock.

14. The process of claim 1, wherein said molybdenum or tungsten and cobalt or nickel components are sequentially incorporated into said activated carbon component with the molybdenum or tungsten component being incorporated prior to the cobalt or nickel component.

15. The process of claim 1, wherein at least one of said molybdenum or tungsten and cobalt or nickel components is incorporated with said activated carbon by impregnating said activated carbon by means of an aqueous solution of a water soluble compound thereof.

16. A process for hydrotreating a hydrocarbon oil feedstock, characterized by a distillation boiling point range such that the fraction boiling at over 650° F. comprises at least 97% of the hydrocarbon oil said process comprising contacting said feedstock under hydrotreating conditions including a temperature of between about 500° F. to about 1200° F., a pressure of from about 0 psig to about 4000 psig and a space velocity of about 0.1 to about 10-hr-1 WHSV in the presence of a catalyst composition comprising an activated carbon component derived from lignite possessing a pore volume in the 100Å to 400Å pore diameter range of at least about 0.08 cc/g., and an average pore diameter of from about 15Å to 100Å, and a tungsten or molybdenum component and a cobalt or nickel component, molybdenum or tungsten component being impregnated prior to the cobalt or nickel.

17. The process of claim 16, wherein at least one of said molybdenum or tungsten and cobalt or nickel components are impregnated into said activated carbon component by means of an aqueous solution of a water soluble compound thereof.

* * * * *